3,733,311
THERMOSET RESIN FROM GLYCIDOL AND A CYCLIC ANHYDRIDE
Richard A. Hickner, Midland, Mich., assignor to The Dow Chemical Company, Midland, Mich.
No Drawing. Continuation-in-part of application Ser. No. 721,076, Apr. 12, 1968, which is a continuation-in-part of application Ser. No. 320,833, Nov. 1, 1963, both now abandoned. This application Oct. 16, 1970, Ser. No. 81,602
Int. Cl. C08g *17/04, 51/10*
U.S. Cl. 260—78.4 EP            12 Claims

ABSTRACT OF THE DISCLOSURE

The reaction of glycidol with a cyclic polycarboxylic acid anhydride produces a thermoset polyester type resin which does not yield water as a by-product of the reaction.

CROSS REFERENCE

This application is a continuation-in-part of my copending application Ser. No. 721,076 filed on Apr. 12, 1968, now abandoned, which in turn is a continuation-in-part of application Ser. No. 320,833 filed Nov. 1, 1963 and now abandoned.

BACKGROUND OF THE INVENTION

This invention relates to thermoset polyester type resins produced by the reaction of a cyclic anhydride of a polycarboxylic acid with glycidol.

Thermosetting resins have been produced by reacting polyhydric alcohols with unsaturated dicarboxylic acids then cross-linking the unsaturated polyester with a vinylidene compound such as styrene to produce an insoluble thermoset resin. Water is a by-product of the initial esterification reaction and it must be removed as the reaction proceeds and prior to the cross-linking step to avoid a change in volume of the resin as it is cured.

I have found that a polyester type of resin can be produced without yielding water as a by-product, thereby eliminating the problems owing to the volumetric change.

SUMMARY OF THE INVENTION

This novel resin is produced by reacting approximately equal molecular quantities of a cyclic anhydride of a polycarboxylic acid with glycidol. Unlike prior polyesters, this resin is cross-linked without further reaction with a vinyl compound. Additionally, the reaction proceeds rapidly at elevated temperatures wtihout the aid of a catalyst. Accordingly, this simplified method of producing a polyester type of resin has considerable utility in the fields of casting, potting, encapsulation, and the like.

DETAILED DESCRIPTION

According to this invention glycidol (2,3-epoxy 1-propanol) is reacted with a cyclic anhydride of a polycarboxylic acid. It is thought that the hydroxyl group of glycidol opens the cyclic anhydride group, producing a half ester of the polycarboxylic acid, with the epoxy group being preserved. Additionally, the half ester carboxylic acid group may react with the epoxide group to give a 2-hydroxy alkyl ester group. This secondary hydroxyl group is also available for reaction with an epoxide group or unreacted anhydride group. Consequently, continued reaction both increases the molecular weight of the resin and crosslinks the resin.

The cyclic anhydrides of polycarboxylic acids which are reacted with glycidol may be either saturated, unsaturated or a mixture thereof. Suitable anhydrides include those of maleic, phthalic, tetrahydrophthalic, dodecenyl-succinic, chlorendic, pyromellitic, citraconic, hexahydrophthalic, endomethylene tetrahydrophthalic, tetrachlorophthalic and hexachloroendomethylene tetrahydrophthalic acid. Pyromellitic anhydride contains two anhydride groups in the molecule, therefore resins may be prepared from it using about one-half the molecular equivalents required of other anhydrides. Said anhydrides include those having no other groups reactive with an epoxide or a hydroxyl group. When at least a part of the anhydride is unsaturated the resin may be cross-linked with a vinyl monomer such as styrene, which is commonly used to cure polyester resins, to produce a higher degree of thermosetting. Between about 1.0 and 10 percent by weight of a vinyl compound may be used to obtain this additional cross-linking.

The reaction of glycidol with cyclic anhydrides to produce resins is illustrated in the following examples.

EXAMPLE 1

An equal molar mixture of maleic anhydride and glycidol was placed in an aluminum cup and the cup kept in an oven at 300° F. for one hour. At the end of that time the mixture in the cup was a hard solid.

EXAMPLE 2

An equal molar mixture of phthalic anhydride and glycidol in an aluminum cup was held at 300° F. for two hours then at 350° F. for an additional two hours. The sample, which was solid at this time, was kept at 350° F. for an additional 20 hours. At the end of that time, a portion of the resin was immersed in acetone for several hours without any noticeable softening or solution taking place.

EXAMPLE 3

Glass fibers in a two inch square mold cavity were covered with an equal molecular mixture of maleic anhydride and glycidol. The mold was heated for 30 minutes at 360° F. and 10,000 lbs./sq. in. to yield a tough, hard laminate. A portion o fthe resin expelled from the mold could not be scratched with a drawing pencil softer than 8H.

EXAMPLE 4

In this experiment, a series of samples were prepared to illustrate the properties of resins from an equal molecular mixture of glycidol and anhydride using a mixture of maleic and phthalic anhydrides. The samples were cured in an oven at 300° F. for six hours then a portion of the sample removed and the remainder cured for an additional 18 hours. The hardness of the samples at the end of the six and 24 hour cures is listed in Table I. The hardness values were obtained by marking the resin with the point of a drawing pencil and determining the softest pencil which would scratch the resin. The quantities of glycidol and anhydride listed in the table are in molecular equivalents.

TABLE I.—HARDNESS OF EQUAL MOLAR GLYCIDOL, ANHYDRIDE RESINS

| | | Anhydride | | Hardness | |
|---|---|---|---|---|---|
| Sample No. | Glycidol | Phthalic | Maleic | 6 hours | 24 hours |
| 1 | 1.0 | 0.4 | 0.6 | 6H+ | 9H |
| 2 | 1.0 | 0.5 | 0.5 | 6H+ | 9H |
| 3 | 1.0 | 0.6 | 0.4 | 6H | 6-9H |
| 4 | 1.0 | 0.7 | 0.3 | 6H | 6-9H |
| 5 | 1.0 | 0.8 | 0.2 | 4H | 9H |

These data illustrate the ability to substitute one anhydride for the other without affecting the cure rate or ultimate hardness by a substantial amount. In general, the resins containing maleic anhydride have a higher initial rate of cure. The unsaturated linkages in the maleic anhydride molecule provide reactive positions for further cross-linking with vinyl compounds.

EXAMPLE 5

Another series of samples were prepared to illustrate the effect of the molar ratio of glycidol to anhydride on the properties of the resin. The anhydride used in these samples was an equal molar mixture of phthalic and maleic anhydrides. The pencil hardness of these samples is given in Table II.

TABLE II.—HARDNESS OF GLYCIDOL, ANHYDRIDE RESINS

| Sample No. | Mole ratio, glycidol/ anhydride | Pencil hardness |
|---|---|---|
| 1 | 1.4 | 9H |
| 2 | 1.2 | 9H+ |
| 3 | 1.0 | 9H |
| 4 | 0.9 | 9H+ |
| 5 | 0.8 | 9H+ |
| 6 | 0.7 | 9H+ |

These samples were cured in an oven at 300° F. After six hours in the oven all samples were hard. These curing conditions were maintained for 22 hours then the pencil hardness determined for each sample. From these results it can be seen that extremely hard resins are obtained with resins containing from 0.7 to 1.4 moles of glycidol per mole of anhydride. All of the resins were light yellow, i.e. Gardner varnish color of 6–7.

EXAMPLE 6

Another group of resin samples were prepared to illustrate the properties of resins prepared with other anhydrides. These samples were prepared and cured in the same manner as those in Example 5, using 1.2 moles of glycidol, 0.5 mole maleic anhydride and 0.5 mole of a second anhydride. The hardness and Gardner color of each of these resin samples are listed in Table III.

TABLE III.—EFFECT OF ANHYDRIDE ON RESIN HARDNESS

| Second anhydride | Pencil hardness | Garnder color |
|---|---|---|
| Tetrahydrophthalic | 9H+ | 2–3 |
| Dodecenylsuccinic | H | 6–7 |
| Chlorendic | 9H+ | 5–6 |
| Citraconic | HB– | 6–7 |
| Pyromellitic | 9H+ | 14–15 |

The resins containing dodecenylsuccinic and citraconic anhydrides had low pencil hardness and a yellow color whereas the others had a high degree of hardness and ranged in color from almost clear to brown.

In preparing resins according to this invention, the resin-forming mixture may contain from 0.5 to 2.5, and preferably between 0.7 and 2.0 moles, of glycidol per anhydride group. The mixture may be cured at a temperature from room temperature in the case of glycidol maleic anhydride mixtures to about 450° F. for mixtures containing other anhydrides. Below 200° F. most anhydrides will not react satisfactorily and in many cases will not melt to produce a homogeneous solution.

In curing resins which contain a high molar ratio of glycidol or if the anhydride is largely maleic anhydride the temperature should be controlled in the initial stages of reaction to prevent runaway reactions from occurring. For example, merely pouring glycidol over maleic anhydride results in an exothermic reaction which takes place quite rapidly. To moderate this reaction it is convenient to use a mixture of anhydrides in which about 20 to 80 mole percent of the mixture consists of maleic anhydride. Additionally, the impact properties of resins containing at least a portion of the maleic anhydride are better than those of resins which do not contain this particular anhydride. Halogenated anhydrides such as chlorendic acid impart flame retardant properties to the resin.

The rate at which the resin cures may be accelerated by adding about 0.1 to 5.0 weight percent of a catalytic agent such as a tertiary amine. Amines which are suitable for this purpose are triethylamine, dimethylaminomethylphenol, tri(dimethylaminomethyl) phenol, and the like. The particular amine used in a resin system usually is selected on the basis of its volatility since the resin usually is cured at an elevated temperature. It is to be understood that catalysts are not required.

The resins of this invention may also contain therein inert fillers such as clay and other minerals; reinforcing materials such as glass fibers, asbestos fiber, etc.; colorants, mold release agents, plasticizers and the like.

I claim:

1. A thermosettable resin composition, capable of being cured without the aid of a catalyst, comprising a mixture of glycidol and a cyclic anhydride of a polycarboxylic acid in the proportions of about 0.5 to 2.5 moles of glycidol per each anhydride group wherein said anhydride contains no other groups reactive with an epoxide or a hydroxyl group.

2. The resin composition of claim 1 wherein said mixture contains from about 0.7 to 2.0 moles of glycidol per anhydride group.

3. The resin composition of claim 1 wherein said anhydride comprises a mixture of an unsaturated anhydride and at least one other cyclic anhydride.

4. The resin composition of claim 3 wherein said other anhydride is phthalic anhydride, tetrahydrophthalic anhydride, dodecenylsuccinic anhydride, chlorendic anhydride, citraconic anhydride or pyromellitic anhydride and wherein said unsaturated anhydride is maleic anhydride.

5. The resin composition of claim 4 wherein said maleic anhydride comprises from about 20 to 80 weight percent of said anhydride mixture.

6. The resin composition of claim 3 further comprising about 1 to 10 percent by weight of a copolymerizable vinyl monomer.

7. A thermoset resin obtained by heating from about room temperature to 450° F. the composition of claim 1.

8. A thermoset resin obtained by heating from about room temperature to 450° F. the composition of claim 2.

9. A thermoset resin obtained by heating from about room temperature to 450° F. the composition of claim 3.

10. A thermoset resin obtained by heating from about room temperature to 450° F. the composition of claim 4.

11. A thermoset resin obtained by heating from about room temperature to 450° F. the composition of claim 5.

12. A thermoset resin obtained by heating from about room temperature to 450° F. the composition of claim 6.

References Cited

UNITED STATES PATENTS

| 3,238,184 | 3/1966 | Stephens | 260—78.4 EP |
| 3,285,881 | 11/1966 | Brack | 260—78.4 EP |

FOREIGN PATENTS

| 1,011,410 | 6/1952 | France | 260—78.4 |

JOSEPH L. SCHOFER, Primary Examiner

C. A. HENDERSON, Jr., Assistant Examiner

U.S. Cl. X.R.

161—192, DIG. 4; 260—37 EP